US007025259B2

(12) United States Patent
Mausy

(10) Patent No.: US 7,025,259 B2
(45) Date of Patent: Apr. 11, 2006

(54) DEVICE FOR CUSTOMIZING AND DISPENSING CONTACTLESS SMART TICKETS

(75) Inventor: Guy Mausy, Colomars (FR)

(73) Assignee: Ask S.A., Valbonne Sophia Antipolis (FR)

( * ) Notice: Subject to any disclaimer, the term of this patent is extended or adjusted under 35 U.S.C. 154(b) by 0 days.

(21) Appl. No.: 11/013,898

(22) Filed: Dec. 17, 2004

(65) Prior Publication Data

US 2005/0139654 A1 Jun. 30, 2005

(30) Foreign Application Priority Data

Dec. 29, 2003 (FR) .................................. 03 15535

(51) Int. Cl.
*G06F 7/08* (2006.01)

(52) U.S. Cl. ...................... 235/381; 235/379; 235/380

(58) Field of Classification Search ................ 235/381, 235/380, 379, 492, 438, 487; 705/43
See application file for complete search history.

(56) References Cited

U.S. PATENT DOCUMENTS

| | | | | |
|---|---|---|---|---|
| 3,361,295 | A | 1/1968 | Marchant | 221/122 |
| 3,822,024 | A * | 7/1974 | Endter et al. | 414/796.6 |
| 3,877,559 | A * | 4/1975 | Burgin | 194/210 |
| 4,045,017 | A * | 8/1977 | Lundblad | 271/181 |
| 4,328,657 | A * | 5/1982 | Brandmaier et al. | 53/586 |
| 4,476,619 | A * | 10/1984 | Palmer | 29/429 |
| 4,866,259 | A * | 9/1989 | Bonnemoy | 235/475 |
| 4,921,237 | A * | 5/1990 | Nubson et al. | 271/11 |
| 5,104,115 | A * | 4/1992 | Saito et al. | 271/185 |
| 5,181,786 | A | 1/1993 | Hujink | 400/61 |
| 5,561,604 | A * | 10/1996 | Buckley et al. | 700/235 |
| 5,695,314 | A * | 12/1997 | Hohmann et al. | 414/796.6 |
| 5,920,055 | A * | 7/1999 | Roth et al. | 235/380 |
| 6,089,457 | A * | 7/2000 | LaManna et al. | 235/475 |
| 6,129,275 | A | 10/2000 | Urquhart et al. | 235/383 |
| 6,142,370 | A * | 11/2000 | LaManna et al. | 235/380 |
| 6,236,220 | B1 * | 5/2001 | Enguent | 324/652 |
| 6,283,368 | B1 * | 9/2001 | Ormerod et al. | 235/380 |
| 6,394,346 | B1 * | 5/2002 | Bonneau, Jr. et al. | 235/438 |
| 6,412,701 | B1 * | 7/2002 | Kohama et al. | 235/488 |
| 6,497,371 | B1 * | 12/2002 | Kayanakis et al. | 235/492 |
| 2002/0198838 | A1 * | 12/2002 | Nicoll et al. | 705/43 |

FOREIGN PATENT DOCUMENTS

| | | | | |
|---|---|---|---|---|
| DE | 200 16 022 | | | 11/2001 |
| EP | 0 008 119 | | | 2/1980 |
| FR | 1 494 243 | | | 9/1967 |
| FR | 2 533 048 | | | 3/1984 |
| FR | 2787429 | A | * | 6/2000 |
| FR | 2 840 432 | | | 12/2003 |
| JP | 2000095380 | A | * | 4/2000 |
| WO | WO 99/54842 | | | 10/1999 |

* cited by examiner

*Primary Examiner*—Uyen-Chau N. Le
(74) *Attorney, Agent, or Firm*—James C. Lydon

(57) ABSTRACT

A device for the customization and automatic dispensing of single smart contactless tickets provided with a device to check the reliability of tickets and a device to customize the tickets, and including a storage location for tickets in the form of a vertical stack. The dispensing device includes a suction cup (20) provided with apparatus to control its vacuum and supported by a movable arm (31) moving along a vertical path, the suction cup enabling the unstacking and removal of a ticket (13) from the storage location and carrying it until it rests on a drive system, and an external antenna (24) adapted to check the reliability of the ticket initially at the time of unstacking.

11 Claims, 4 Drawing Sheets

DEVICE FOR CUSTOMIZING AND DISPENSING CONTACTLESS SMART TICKETS

TECHNICAL FIELD

The present invention concerns a device for automatic dispensing of single disposable tickets and particularly concerns a device for customizing and dispensing contactless smart tickets.

BACKGROUND

Machines for dispensing disposable tickets, such as paper tickets, usually store the tickets in the form of rolls or as fanfold paper. According to these two methods of storage, the tickets are stuck together in the form of strips. This system has the advantage of being able to dispense continuously but occupies a lot of space. A guillotine cutter cuts the ticket on request just before it is dispensed. Unfortunately, this type of dispensing machine is not entirely suitable for disposable contactless smart tickets called "contactless tickets". Actually, the production efficiency of contactless tickets is less than that of ordinary disposable tickets considering their technology that requires more precision. The method of storing tickets in continuous rolls does not allow for the removal of defective tickets during production and thus all defective tickets, about 5% of the lot, are retained. With every ticket being checked prior to it being issued to the client and every defective ticket being directed to a waste storage location, the large proportion of defective tickets increases the mean delivery time of a ticket to the client. Furthermore, the storage of tickets in continuous rolls and the large proportion of defective tickets requires a significant volume within the dispensing machine.

In order to reduce the number of defective tickets, one solution consists in discarding them before they are inserted into the dispensing machine. This solution therefore requires the storage of tickets in the form of stacks in the dispenser and it also helps overcome space problems. This type of dispenser exists for dispensing plastic cards or "polyester" tickets whose physical characteristics, such as the elasticity, are similar to that of plastic. The polyester cards or tickets are stored one by one in stacks and are unstacked as they are dispensed. Certain systems operate by pushing the card with a blade that presses on the thickness of the card to unstack the cards. Other systems bend and pinch the card by using the stiff and elastic properties of the card. Apart from the fact that these dispensing systems where the cards are stored in stacks save a significant amount of space compared with a roller dispensing system, they also allow tickets to be reused, i.e. the re-dispensing of tickets already distributed once, which is impossible when the tickets are stored in rolls or as fanfold paper.

Unfortunately, these methods for unstacking single tickets are not suitable for disposable contactless smart paper tickets. Actually, this type of ticket has very specific physical characteristics compared with ordinary disposable tickets. Its surface is not flat but is raised where the chip is located. Furthermore, unlike the plastic card, the ticket is not elastic enough to fully recover its initial configuration when the pressure exerted on the ticket is released. Finally, such a ticket may be crinkled along its axes. There are therefore no dispensing devices suitable for contactless smart tickets and thus, in addition, there do not exist any automatic dispensing devices for contactless smart tickets. As a result, dispensing as well as customizing contactless smart tickets currently requires manual intervention.

SUMMARY OF THE INVENTION

This is why the object of the invention is to create a compact device for automatic dispensing of smart contactless paper tickets.

Another object of the invention is to create a device for dispensing single contactless smart paper tickets capable of programming and marking every ticket in order to customize it according to request.

The object of the invention is thus a device for customizing and automatically dispensing single smart contactless tickets provided with means to check the reliability of tickets and means to customize the tickets and including a storage location for tickets in the form of a vertical stack. According to the main characteristic of the invention, the dispensing device includes a suction cup provided with means to control its vacuum and integral with a movable arm moving along a vertical path, the suction cup enabling the unstacking and removal of a ticket from the storage location and carrying it until it rests on a drive system, and an external antenna adapted to check the reliability of the ticket initially at the time of unstacking.

BRIEF DESCRIPTION OF THE DRAWINGS

The purposes, objects and characteristics of the invention will become more apparent from the following description when taken in conjunction with the accompanying drawings in which.

DETAILED DESCRIPTION OF THE INVENTION

Figure 1:
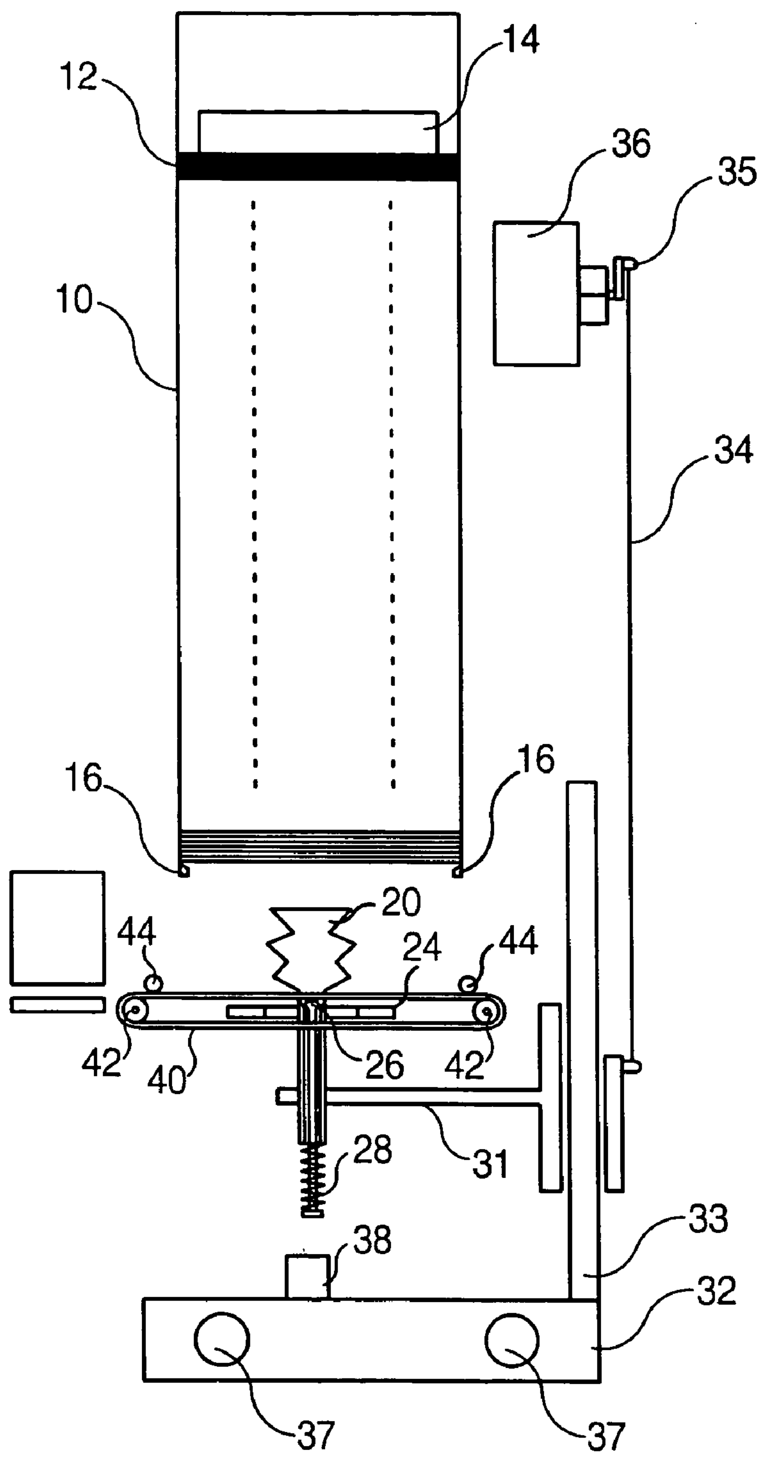
FIG. 1 represents a diagrammatic section of the dispensing machine according to the invention.
Figure 2:
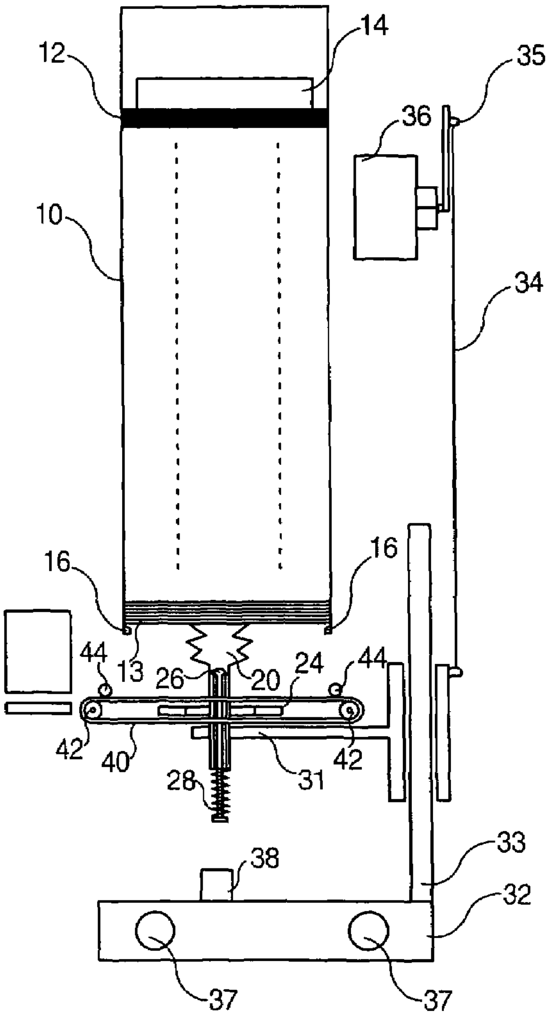
FIG. 2 represents a diagrammatic section of the dispensing machine according to the invention during grasping of the ticket.

According to the diagrammatic view of FIG. 1, the dispensing machine consists of at least one removable cassette 10 containing about 500 contactless smart tickets 12 stacked and compressed vertically with a weight 14. The contactless smart tickets include an antenna and a unit or a chip connected to the antenna. The stack of tickets rests on the two edges or bosses 16 of the cassette 10. Between the bosses 16, a flapper opening allows the tickets to pass through. The dispensing machine includes a carriage consisting of a movable arm 31 moving along a vertical path on which a suction cup 20 is fixed. A table, not shown in the figure, on which an antenna is engraved, has an opening at its center adapted for the suction cup 20 to pass through.

Two parallel smooth belts 40 supported and driven each by two pulleys 42, which are themselves driven by a motor, are placed parallel to the edges of the table so as to enclose the table. The antenna 24 is placed at the periphery of the table so as to enclose the opening located at its center. According to a variant, the antenna is fixed to the movable arm 31 and the opening in the table allows the suction cup 20 and the antenna 24 to pass through. The antenna 24 is connected to at least one microprocessor not shown in the figures and equipped with a memory. The two belts constitute driving means for the tickets and are placed under the stack of tickets parallel to the plane of the tickets. Two rollers 44 press on the recesses of the parallel belts 40 just next to the pulleys 42. The arm 31 is set in motion by a lifting/lowering mechanism made up mainly of a plate 32, a column 33 attached to the plate, a motor assembly 36, a crankshaft 35 and a connecting rod 34. The arm 31 is guided along its vertical path by the column 33 and set in motion by the motor, crankshaft and connecting rod assembly. The suction cup 20 moves in the direction perpendicular to the plane of the tickets so that its grasping plane is in the plane of the tickets. The suction cup 20 preferably moves along an axis perpendicular to the ticket passing through the center of the ticket or passing through the ticket's center of gravity. The suction cup 20 is of the release suction cup type and has means to control its vacuum such as, preferably, a valve 26 kept closed by a spring 28.

Figure 3:
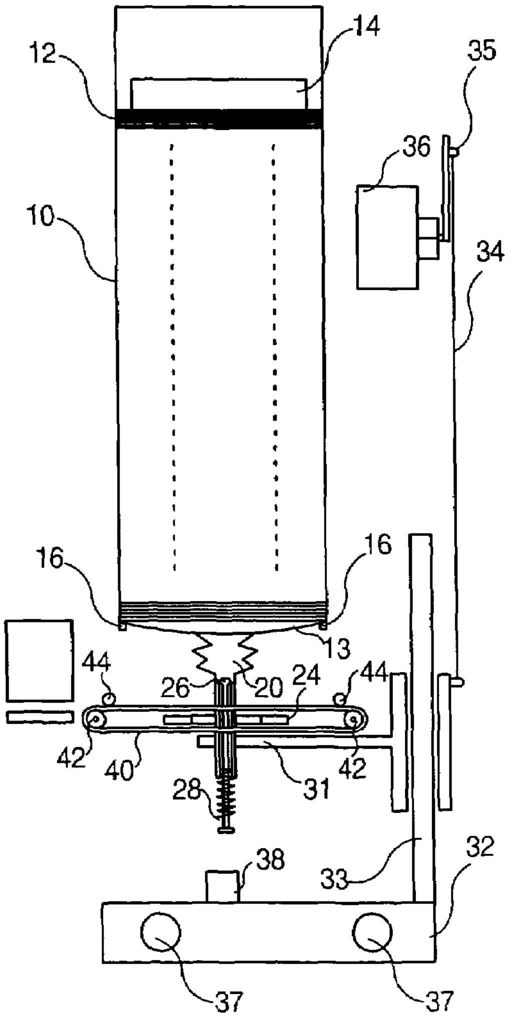
FIG. 3 represents a diagrammatic section of the dispensing machine according to the invention during unstacking of the ticket.
Figure 4:
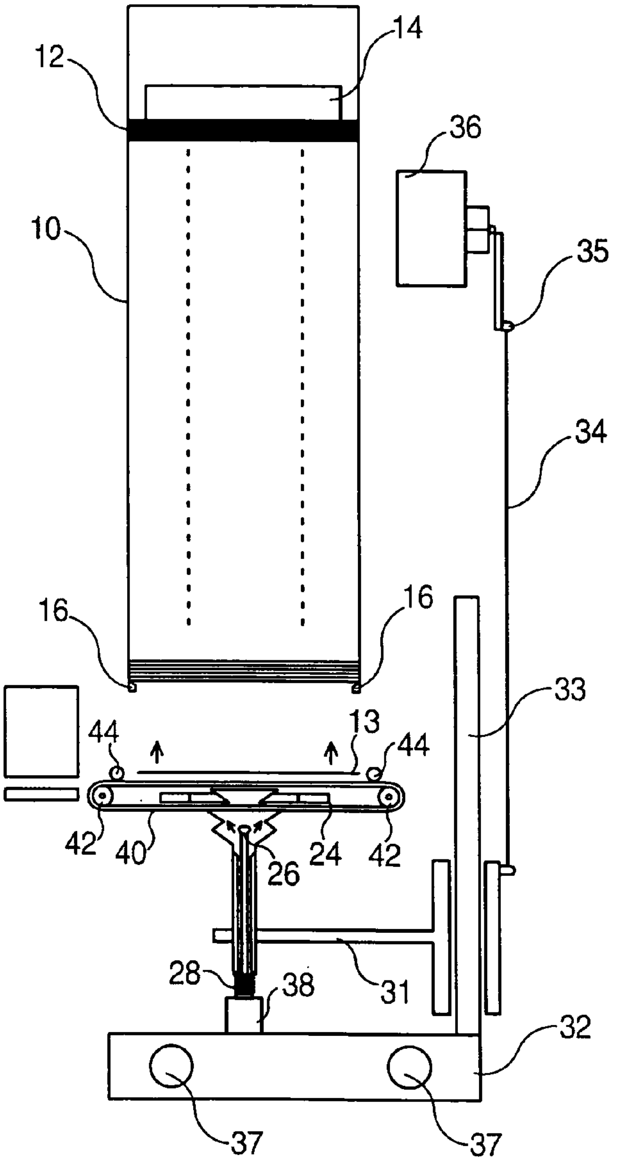
FIG. 4 represents a diagrammatic section of the dispensing machine according to the invention during release of the ticket.

The stages of operation of the dispensing machine are diagrammatically shown in FIGS. 2 through 5. Tickets are unstacked one by one on request from the client who formulates his/her request via a communicating interface with the dispensing machine's microprocessor. According to FIG. 2, the suction cup 20 and the arm 31 are set in motion and when the suction cup comes in contact with the first ticket 13, it compresses itself while letting the air escape from the side of the suction cup as it cannot be removed by the internal valve 26 that is closed. While the crankshaft 35 passes the top dead center and the motor 36 continues to rotate, the suction cup tends to decompress itself and thus creates a vacuum, which drags the ticket 13 downwards. The ticket 13 first held by the bosses 16 of the cassette loses its shape, as shown in FIG. 3 and ends up coming out of the cassette. The suction cup 20 on which the ticket 13 is held and the arm continue their downward movement until the spring 28 is compressed on the stop 38 of the plate 32 as shown in FIG. 4. When the spring 28 is compressed, the valve is driven upwards and lets the air into the suction cup as it opens up thereby releasing the vacuum from it which in turn releases the ticket.

Figure 5:
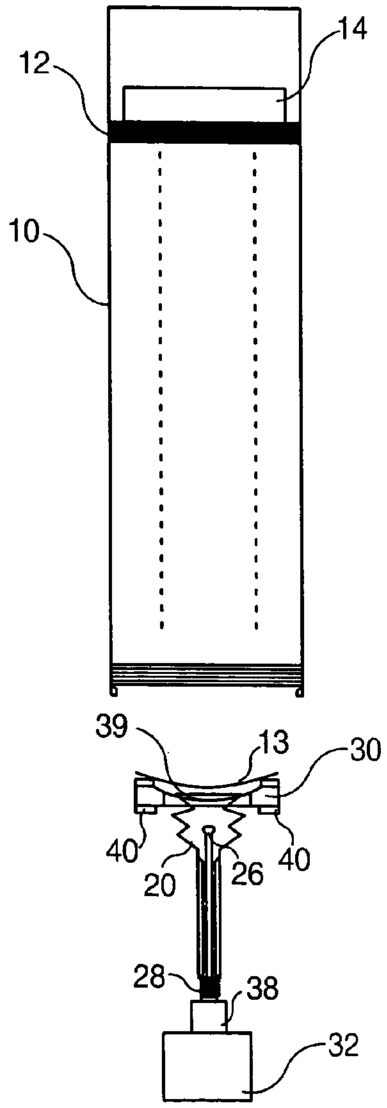
FIG. 5 is a diagrammatic section of the ticket guiding table.

According to FIG. 5, which represents a diagrammatic section according to a plane perpendicular to the sectional planes of FIGS. 1 to 4, the belts 40 are parallel and located around the table 30 so that they are supported. The table 30 consists of a groove 39 in which the ticket rests when it is driven by the suction cup 20. The groove 39 helps cope with unevenness of tickets and ensure they will always rest on the belts 40. Once released from the suction cup, the ticket 13 then rests on the two parallel belts 40. The operation that consists in taking the ticket 12 from the stack and bringing it up to the driving device constitutes unstacking of the ticket.

Figure 6:
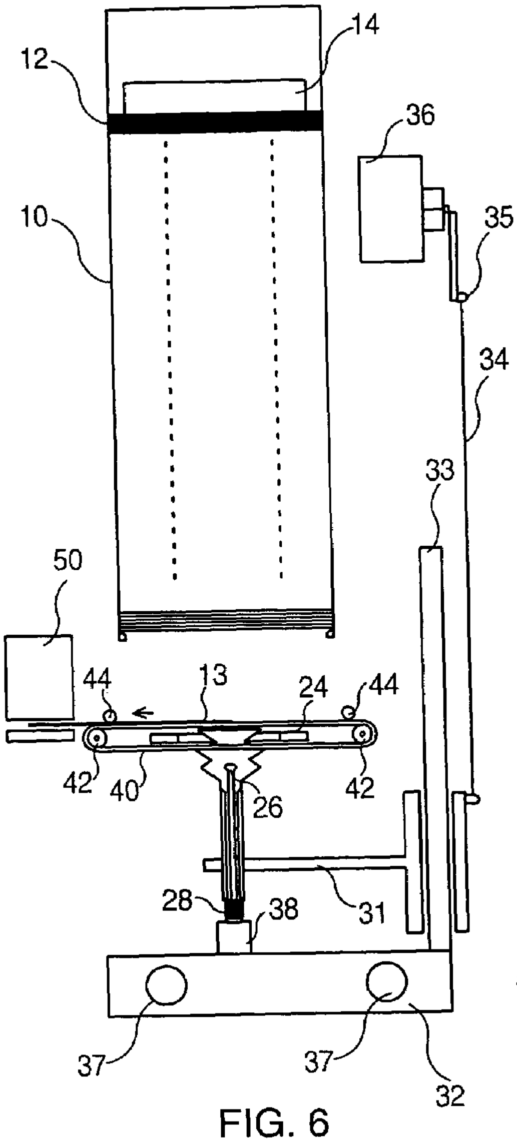
FIG. 6 represents the marking of the ticket in a diagrammatic section and FIG. 7 represents the removal of a defective ticket in a diagrammatic section.

With reference to FIG. 6, the ticket is then subjected to an initial check by the antenna 24, located around the suction cup 20 in order to determine whether the ticket is able to communicate with an external antenna and therefore determine the reliability of the ticket. The checking operation is possible thanks to a communication protocol programmed in the microprocessor, which manages the communication and data exchange between the disposable contactless smart ticket and the antenna. If the ticket communicates, the microprocessor transmits a message to the motor driving the pulleys, which then rotate in a direction that makes the belts 40 rotate according to a movement that feeds the ticket into a printer 50. The free rollers 44 press on the belts 40 to lay the ticket flat and ensure that it is fed. The printer in turn drives the ticket and marks it with graphical information in order to customize or number it. The speed differential between the belts and the printer, if any, is compensated by the sliding of the ticket on the smooth belts. The ticket is printed by a standard thermal printer.

Figure 7:
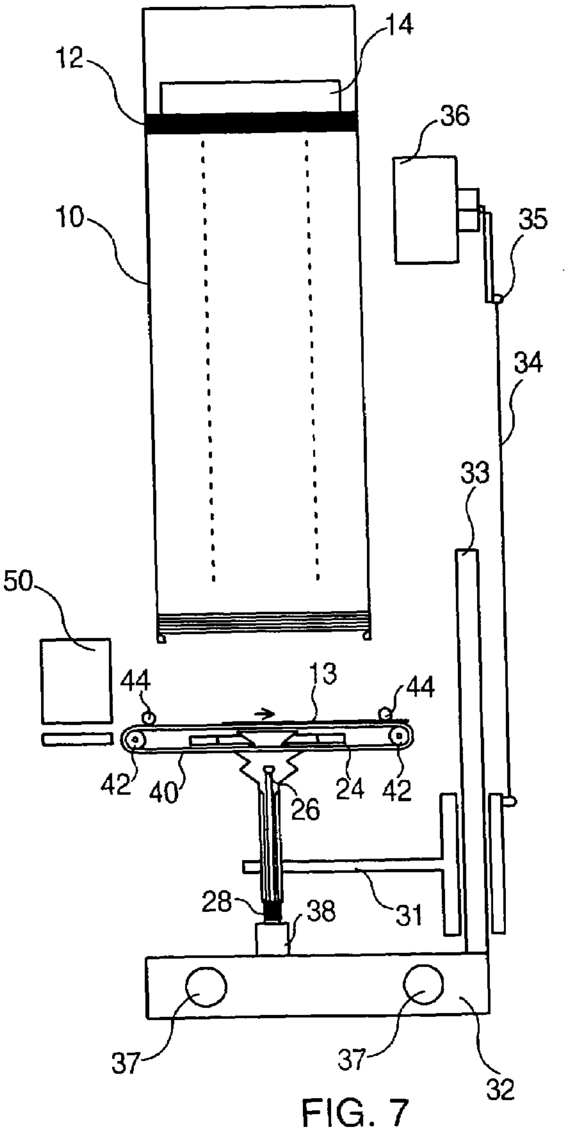

Once the ticket is printed, it is put back by the printer on the belts 40. The ticket is then re-checked by the antenna, then electronically programmed by the antenna that receives its instructions from the microprocessor to complete the customization. For this, digital data is transmitted by the antenna 24 and the ticket's antenna to the chip of the ticket by means of the communication protocol. The digital data transmitted is adapted to the type of use of the ticket and possibly the user's request via the communicating interface connected to the microprocessor. For example, there may be a certain quantity of time units for a parking ticket that determine its validity period. The checking and programming times are very short, in the order of a few tenths of a second. Once the ticket is programmed, it is validated so that it may be distributed to the client. The antenna then transmits to the microprocessor a motor control message for driving the pulleys, which then rotate in a direction that makes the belts 40 rotate with a movement that takes the ticket towards the dispensing outlet located on the side opposite the printer as shown in FIG. 7.

During checks that are carried out at the time of unstacking and at the time of programming, if a communication error is detected, the antenna transmits the information to the microprocessor so that the printer ejects the ticket to a tray located downstream of the printer where all rejected tickets are automatically stored. This arrangement helps do away with a switch system and improves the compactness of the product.

As shown in FIGS. 1 to 7, the plate 32 is guided during travel by two pins 37 with the help of a mechanism not shown in the figure for an embodiment with two ticket cassettes. This non limiting characteristic of the invention enables the carriage to be moved horizontally and positioned in front of another cassette when the first cassette is empty or otherwise unavailable. However, according to a variant of the embodiment of the invention, the ticket-dispensing machine is equipped with two cassettes and two identical carriages as described previously, each carriage being stationary and designed to extract the tickets from one of the two cassettes. Preferably but not necessarily, the cassettes of this invention are secure and reusable. They are refilled in a secure workshop. At the time of their closure they are set to allow only one insertion into the ticket-dispensing machine. A lead seal, or any other equivalent method, ensures that the cassette is not opened during its duty cycle outside the secure workshop. The cassettes will be locked when they are being transported, making it difficult to extract the tickets without visible damage. When it is inserted into the ticket-dispensing machine, the cassette will be unlocked and its flapper will open enabling the tickets to be dispensed. Then, when the cassette is removed from the dispensing machine, its flapper will be locked again but will be disarmed, preventing it from being reopened and therefore reinserted into the ticket dispensing machine. In this way, it is not possible to reinsert a cassette that is empty, half-full or removed for unavailability.

According to an embodiment with two cassettes, the ticket dispensing machine uses all tickets from the first cassette and when the latter is empty the dispensing automatically switches over to the second cassette. A light indication informs the maintenance personnel of the condition of the cassettes: in operation, empty or faulty.

The ticket-dispensing machine according to the invention has the advantage of being able to adapt themselves to various client interface systems commercially available. Furthermore, the communication protocol programmed in the microprocessor is capable of communicating through a computer, a network, a modem or even in a standalone manner.

The ticket-dispensing machine according to the invention has the advantage of being small in size, in the order of 400 mm×200 mm×150 mm. Thus, it can easily be integrated with ordinary disposable ticket dispensing machines without major modifications to these or can even be placed on a desk.

In addition, the invention can be adapted to tickets of different shapes and materials, with chips of various sizes without having to be modified. The invention may be applied particularly to "tag" type tickets and/or "RFID" (Radio Frequency Identification) tickets.

Thanks to the single dispensing mode of the invention, tickets that are already used may be reinserted into the cassette so that they can be reprogrammed and re-dispensed even if they are crumpled or have folds.

What is claimed is:

1. A device for customization and automatic dispensing of single smart contactless tickets, said device comprising a removable cassette for storing the tickets in the form of a stack, said removable cassette including opposed bosses for supporting the stack of tickets;

a suction cup provided with means to control a vacuum and supported by a movable arm adapted to move along a vertical path, said suction cup adapted to remove a ticket from a bottom of the stack of tickets in said removable cassette by deforming said ticket such that said ticket can pass between said opposed bosses and come out of said cassette, said suction cup further adapted to carry said ticket from said removable cassette to a drive system;

means to check the reliability of the tickets, including an external antenna adapted to check the reliability of said ticket initially at the time of unstacking; and means to customize the tickets.

2. The device of claim 1, wherein said means to customize the tickets includes a thermal printer to print customized graphical information on said ticket.

3. The device of claim 2, wherein said drive system is adapted to direct said ticket either towards said thermal printer, or towards a storage tray for rejected tickets, or towards a dispensing outlet.

4. The device of claim 3, wherein said drive system automatically directs a ticket that does not communicate with said external antenna towards said storage tray for rejected tickets.

5. The device of claim 1, wherein said means to check the reliability of the tickets is adapted to check said ticket and electronically program said ticket when said ticket rests on said drive system.

6. The device of claim 1, further comprising a microprocessor provided with a memory, said microprocessor being connected to said external antenna, and adapted to transmit data to a chip of the ticket via the external antenna and an antenna of the ticket in accordance with a communication protocol programmed into said microprocessor.

7. The device of claim 6, further comprising a communicating interface connected to said microprocessor, wherein said ticket can be electronically programmed and said customization finalized by an external user.

8. The device of claim 1, wherein said movable arm is driven in translation by a motor, crankshaft and connecting rod assembly.

9. The device of claim 1, wherein the vacuum control means of said suction cup comprises a valve kept closed by a spring.

10. The device of claim 1, wherein a cassette is equipped with a flapper that remains closed and locked when the cassette is removed from the dispensing machine.

11. The device of claim 1, wherein the contactless smart ticket is a paper ticket.

* * * * *